June 5, 1928.
G. C. HILL
SPOKE TIGHTENER
Filed July 28, 1925
1,672,643
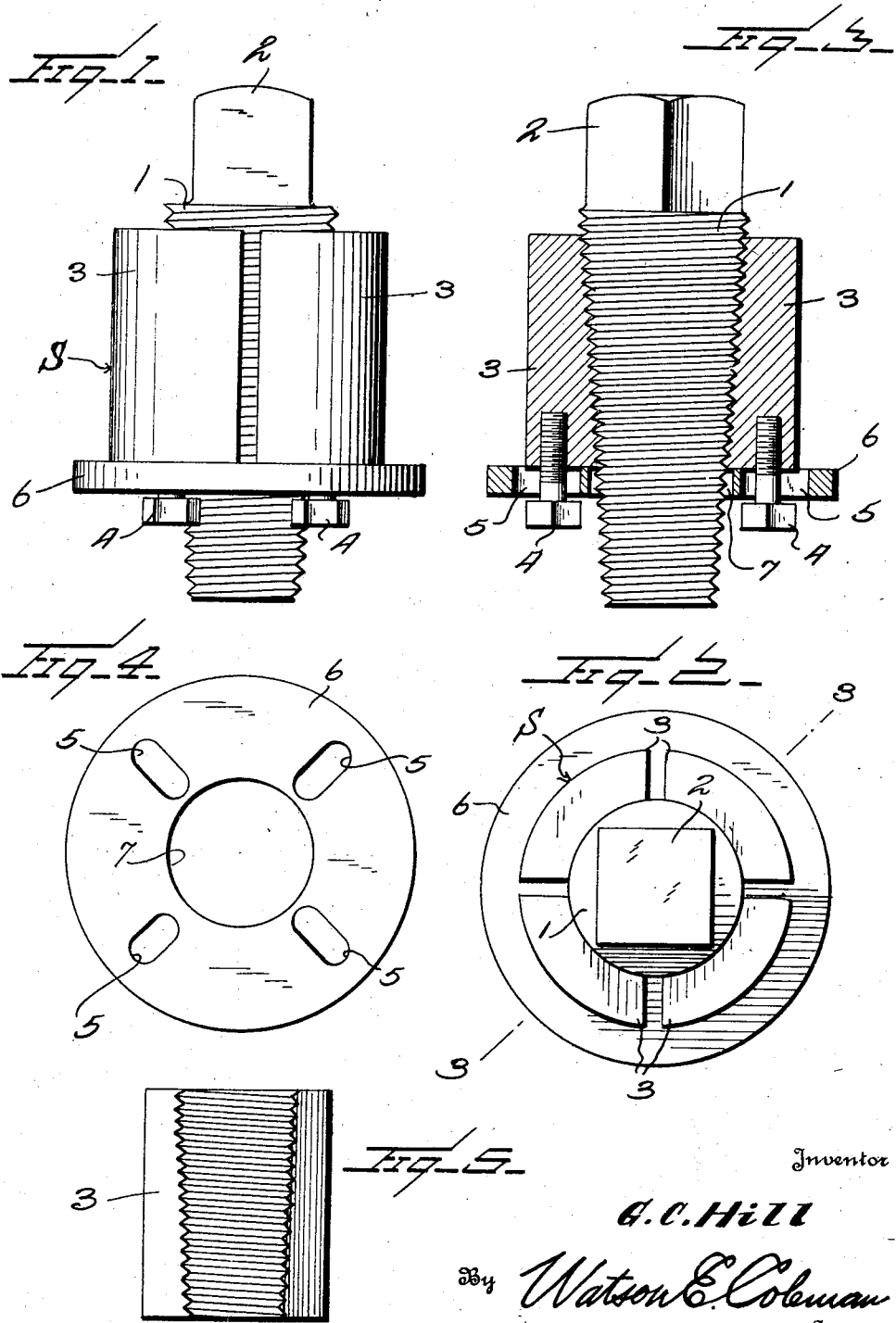
Inventor
G. C. Hill
By Watson E. Coleman
Attorney Patented June 5, 1928.

1,672,643

UNITED STATES PATENT OFFICE.

GROVER CLEVELAND HILL, OF PHOENIX, ARIZONA, ASSIGNOR OF FIFTY PER CENT TO MARK PACKARD BLAEMIRE, OF PHOENIX, ARIZONA.

SPOKE TIGHTENER.

Application filed July 28, 1925. Serial No. 46,588.

This invention relates to certain improvements in spoke tighteners and it is an object of the invention to provide a device of this general character adapted to coact with the inner ends of the spokes of a wheel to force the same outwardly to properly engage the outer portions of the spokes with the felly of the wheel.

Another object of the invention is to provide a device of this general character comprising a tapered screw operatively engaged within a split sleeve provided by a plurality of separable members or sections together with means for maintaining said members or sections of the sleeve in assembled relation yet permitting the same to have outward movement under the action of the screw.

The invention consists in the details of construction and in the combination and arrangement of the several parts of my improved spoke tightener whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a side elevation of a spoke tightener constructed in accordance with an embodiment of my invention;

Figure 2 is a view in end elevation of the device as illustrated in Figure 1;

Figure 3 is a view partly in elevation and partly in section of the structure as illustrated in Figure 1;

Figure 4 is a view in elevation of the annular member or washer as herein disclosed unapplied;

Figure 5 is a view in inside elevation of a section of the sleeve as herein set forth.

My improved device as herein disclosed comprises an elongated tapered screw 1 of requisite dimensions having its larger end provided with an angular head 2 with which a suitable turning implement is adapted to be engaged. This screw is adapted to have threaded engagement with the inner faces of the sections or members 3 comprised in the split sleeve S, said sections or members when at the limit of their inward movement having their adjacent margins substantially in contact to provide a bore tapered to correspond to the taper of the screw 1.

Adjacent ends of the sections or members 3 at substantially the centers thereof have engaged therewith the screws or bolts 4 each disposed through a slot 5 provided in the annular member or washer 6, said slot radiating from the axis of the annular member or washer 6. The central opening 7 defined by the annular member or washer 6 is of a diameter in excess of the normal diameter of the sleeve S at its adjacent or smaller end.

In practice, the hub of a wheel is removed and the sleeve S substituted therefor and as the screw 1 is turned in a direction to cause the same to move inwardly of the sleeve S, said sleeve will be caused to expand as a result of the outward movement of the members or sections 3 whereby the spokes are forced outwardly to assure effective engagement of the outer portions of the spokes with the felly of the wheel, and such engagement maintained until the conventional steel liners have been placed between the spokes at their inner or hub end portions.

The bolts or screws 4 provide means whereby the members or sections 3 of the sleeve S are maintained against displacement with respect to the annular member or washer 6 while the slot 5 in such member or washer permits the sections or members 3 to have requisite outward movement.

From the foregoing description it is thought to be obvious that a spoke tightener constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A spoke tightener comprising a sleeve consisting of a plurality of separable sections, said sleeve having a tapered bore, an annular member overlying the ends of the sections of the sleeve at the smaller end of the bore and provided with radial slots, a headed member disposed through each of said slots and connected to the adjacent end of a section of the sleeve, and a tapered screw working in the bore of the sleeve, the larger end of the screw being provided with a working head.

In testimony whereof I hereunto affix my signature.

GROVER CLEVELAND HILL.